US010924194B2

(12) United States Patent
Belfiore

(10) Patent No.: US 10,924,194 B2
(45) Date of Patent: Feb. 16, 2021

(54) RADIO-FREQUENCY TRANSCEIVER DEVICE, CORRESPONDING SYSTEM AND METHOD

(71) Applicant: STMicroelectronics S.r.l., Agrate Brianza (IT)

(72) Inventor: Francesco Belfiore, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/394,633

(22) Filed: Apr. 25, 2019

(65) Prior Publication Data

US 2019/0334640 A1 Oct. 31, 2019

(30) Foreign Application Priority Data

Apr. 30, 2018 (IT) .................. 102018000004974

(51) Int. Cl.
*H04B 17/29* (2015.01)
*H04B 1/40* (2015.01)

(52) U.S. Cl.
CPC .............. *H04B 17/29* (2015.01); *H04B 1/40* (2013.01)

(58) Field of Classification Search
CPC ........ H04B 17/17; H04B 17/19; H04B 17/29; H04B 1/40
See application file for complete search history.

(56) References Cited

U.S. PATENT DOCUMENTS 5,867,123 A 2/1999 Geyh et al.
6,335,700 B1 * 1/2002 Ashihara .............. G01S 7/4004
342/117

(Continued)

FOREIGN PATENT DOCUMENTS

| CN | 1721874 A | 1/2006 |
| CN | 102680961 A | 9/2012 |
| EP | 1026515 A1 | 8/2000 |

(Continued)

OTHER PUBLICATIONS

IT Search Report and Written Opinion for IT Appl. No. 102018000004974 dated Dec. 4, 2018 (12 pages).

(Continued)

*Primary Examiner* — David Bilodeau
(74) *Attorney, Agent, or Firm* — Crowe & Dunlevy

(57) ABSTRACT

A radio-frequency transceiver device includes a transmission circuit generating a transmission signal at a transmission pad connected to a transmission antenna by modulating a radio frequency signal as a function of a control signal. First and second reception circuits receive first and second signals at first and second reception pads connected to first and second reception antennas. The received first and second signals are demodulated via the radio frequency signal to generate first and second demodulated reception signals. A control circuit operates during a reception test phase to generate only the control signal in order to test, as a function of the first and second demodulated reception signals, whether the received first signal corresponds to the received second signal. A reception error signal indicating a reception error is generated when the test indicates that the received first and second reception signals do not correspond.

22 Claims, 5 Drawing Sheets

(56) References Cited

U.S. PATENT DOCUMENTS

2013/0344831 A1* 12/2013 Yuan .................... H04W 24/04
455/226.2
2018/0302178 A1* 10/2018 Lloyd ................ H04B 17/0085

FOREIGN PATENT DOCUMENTS

| EP | 2866040 B1 | 7/2017 |
|----|------------|--------|
| JP | 2008292244 A | 12/2008 |
| WO | 2012119269 A1 | 9/2012 |

OTHER PUBLICATIONS

H. Knapp et al., "Three-channel 77 GHz automotive radar transmitter in plastic package", IEEE Radio Frequency Integrated Circuits Symposium (RFIC), 2012, pp. 119-122.
First Office Action and Search Report for co-pending CN Appl. No. 201910354605.3 dated Nov. 2, 2020 (12 pages).

* cited by examiner

RADIO-FREQUENCY TRANSCEIVER DEVICE, CORRESPONDING SYSTEM AND METHOD

PRIORITY CLAIM

This application claims the priority benefit of Italian Application for Patent No. 102018000004974, filed on Apr. 30, 2018, the content of which is hereby incorporated by reference in its entirety to the maximum extent allowable by law.

TECHNICAL FIELD

The present description relates to radio-frequency transceiver devices, for example, integrated circuit chips, that may be employed in different fields of application, for example in radar system, for example, in automotive scenarios moving towards autonomous driving.

One or more embodiments may be applied to integrated circuits (IC) for Ultra-WideBand (UWB) radars, Frequency-Modulated Continuous-Wave (FMCW) radars and/or other radar systems, for example, for automotive and consumer applications.

BACKGROUND

Radar systems are used in a wide area of applications. For example, radar systems may be used to detect obstacles in front of a vehicle, for example, in order to automatically activate the brakes of the vehicle or maintain an approximately constant distance to a preceding vehicle.

For this purpose, such radar systems often use a plurality of transmission antennas and reception antennas that are often connected to an integrated circuit which is configured to manage the various transmission and reception channels.

In the context of automotive applications, the international standard ISO26262 specifies the requirement for functional safety of electrical and/or electronic devices. This standard requires a monitoring of the components within such devices in order to detect defects and/or failures during its operative life. For example, when applying the ISO26262 standard to radar systems, it should be possible to detect malfunctions of the integrated circuit used to handle the transmission and reception channels.

However, certain issues may arise when applying the monitoring functions to radio frequency components of a device, such as the transmission and reception chains, that is the monitoring functions may impact on overall performance of the radio-frequency system.

A conventional approach may include employing redundancy approaches, for example providing devices having two different integrated devices having a same purpose, so that if a device fails the remaining device may still operate. Also, for example, for certain pad connections, a solution may comprise solder ball redundancy, that is providing for a single pad different solder balls. However, it has been observed that, for millimeter Wave (mmW) reception input pads and transmission output pads, such ball redundancy approach may result in an impact on RF performance for the radio-frequency system, for example in terms of frequency bandwidth and package losses.

Other known solutions for testing the connection of input/output pads to respective mmW solder balls involve the testing of connections by measuring an impedance of the transmission pads of a radar transmitter to detect and report (large) deviations that may indicate a solder ball break. Such a solution is described for example, in document H. Knapp et al., "Three-channel 77 GHz automotive radar transmitter in plastic package", IEEE Radio Frequency Integrated Circuits Symposium (RFIC), 2012, (incorporated by reference). However, this solution may increase complexity of the output matching network and may compromise overall internal losses of the mmW pad, thereby reducing the power output.

Also, European Patent No. 2866040 A (incorporated by reference) discloses a testing circuit for testing an IC connection between an RF chip and external circuitry. In the document, to test a connection, a current source may be used for injecting a DC current towards a connection to be tested from the chip side, and a shunt path may be coupled to the connection to be tested on the external circuitry side. However, this solution may result in a (strong) impact on mmW frequencies in terms of isolation and/or losses.

Improved solutions are thus desirable, that may be able to comply with the ISO26262 standard while avoiding impacting on the performance of the system.

SUMMARY

According to one or more embodiments, the aforementioned issues may be addressed by means of a radio-frequency RF transceiver device having the features set forth in the claims that follow.

One or more embodiments may include a corresponding system (for example, a system comprising the RF transceiver device and one or more transmission and reception antennas), and a corresponding method of operating the device.

The claims are an integral portion of the disclosure of the invention as provided herein.

One or more embodiments may relate to a radio-frequency device, for example a 76-81 GHz radar packaged transceiver, comprising a (for example, integrated) circuit for testing defects/faults in electrical connection of transmission chains and reception chains of radio-frequency devices, for example, solder balls break detection in radar sensors assembled in eWLB or FCBGA packages. The radio-frequency transceiver device may comprise:
  at least a first transmission pad, configured to be connected to a respective first transmission antenna;
  at least a first transmission circuit, configured to generate a respective first transmission signal for the first transmission pad by modulating a radio frequency signal as a function of a respective first transmission control signal;
  at least a first and a second reception pad, configured to be connected to a respective first and second reception antenna;
  at least a first and a second reception circuit, configured to generate a respective first and second reception signal by demodulating via the radio frequency signal a respective first and second signal received by the first and the second reception pad.

The radio-frequency transceiver device may comprise a control circuit, that during a reception test phase may be configured for:
  generating the first transmission control signal and testing whether the first reception signal received by the first reception pad corresponds to the second reception signal received by the second reception pad; and when the test indicates that the first reception signal and the second reception signal do not correspond, generating a reception error signal indicating a reception error.

For example, a difference in amplitude of the first reception signal and the second reception signal may be indicative a defect or break present in a solder ball of one or more RF reception chains.

The radio-frequency device according to one or more embodiments may be suitable for different types of frequency applications, for example high-frequency applications such as microwave and/or millimeter Wave mmW systems. Also, the control circuit of the radio-frequency device may facilitate complying with the ISO 26262 standard, while avoiding impact on overall performance of the device (or chip), for example, on the RF performance of the device.

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
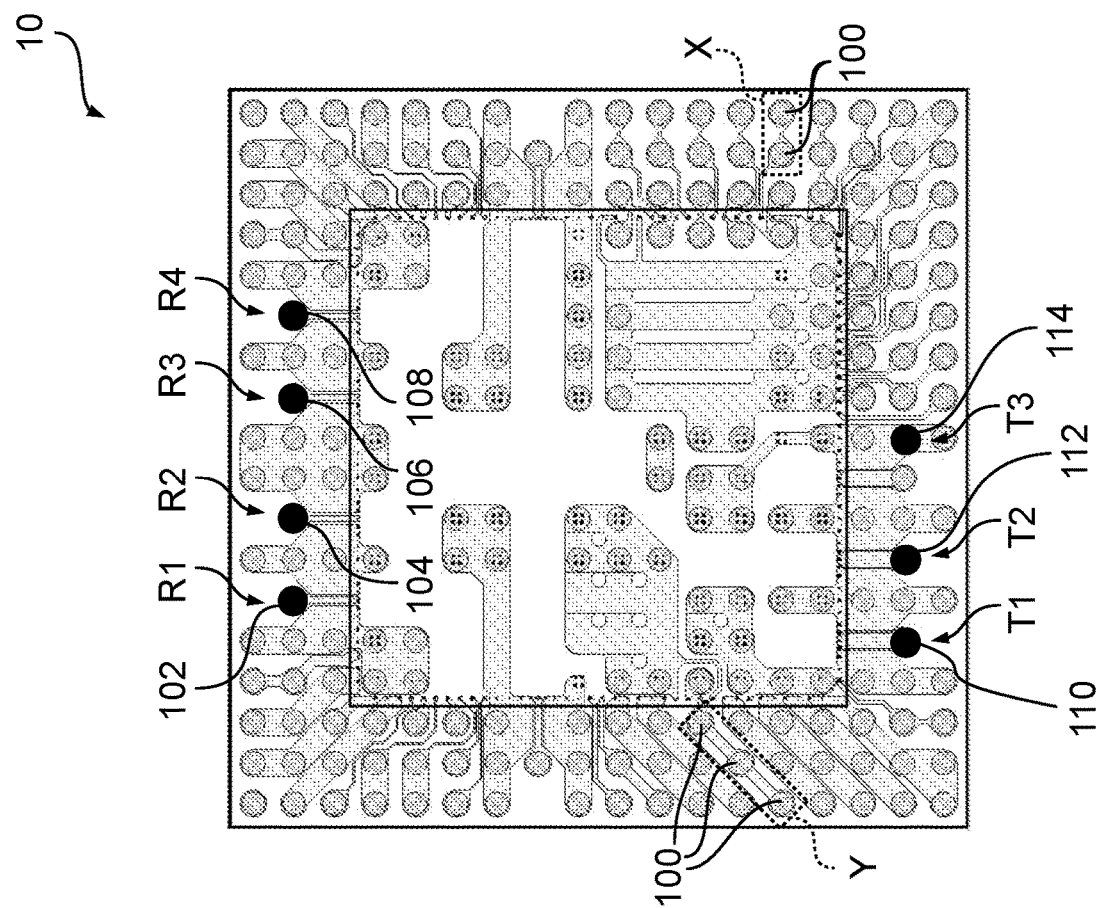
FIG. 1 exemplifies a back view of a device according to one or more embodiments.

FIG. 1 exemplifies a back view of a (for example, radio-frequency) device 10 according to one or more embodiments. The device 10 may be coupled to a printed circuit board PCB (not visible) via one or more solder formations, hereinafter represented as solder balls 100-114.

Generally, for certain pads, for example, functional input/output pads of the device 10, the redundancy ball approach already discussed may be feasible, and different solder balls 100 may be electrically-connected to common pads X, Y, exemplified as dashed-line rectangles in FIG. 1. Conversely, for certain other pads of the device 10, for example, a first, second, third and fourth reception pad R1, R2, R3, R4 and a first, second and third transmission pad T1, T2 and T3, redundancy approaches may not be desirable, and respective single first, second, third, fourth reception solder ball 102-108 plus respective single first, second, third transmission solder ball 110-114 may be provided for coupling such pads to the PCB. As already discussed, the transmission pads T1-T3 and the reception pads R1-R4 may be coupled, via the PCB and the solder balls 102-114, to respective transmission and reception antennas.

Figure 2:
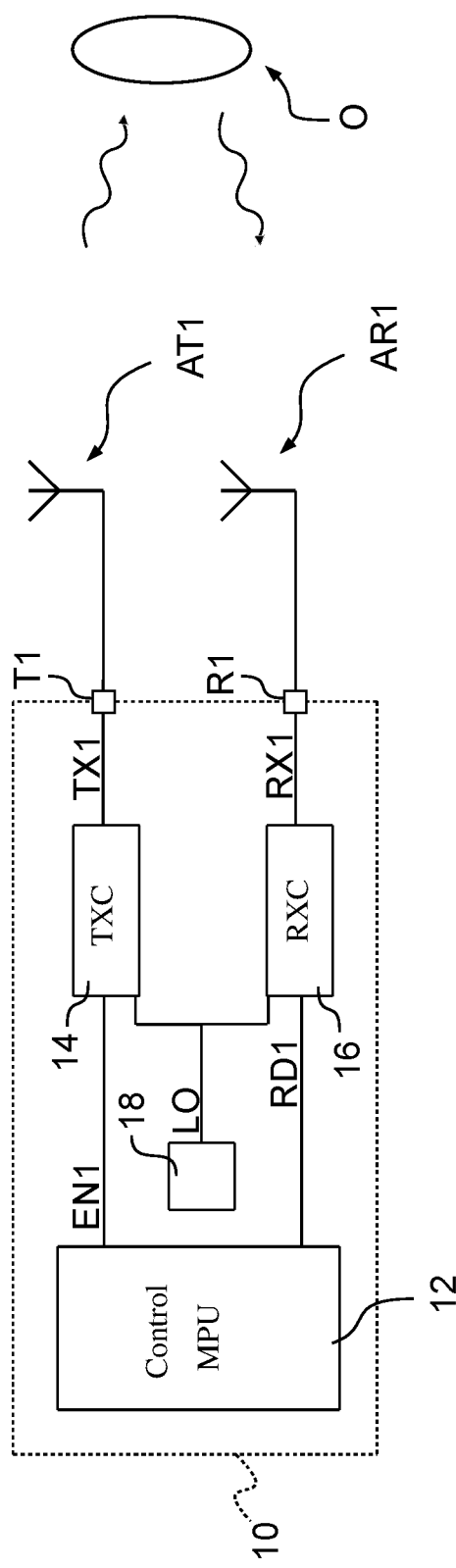
FIGS. 2 and 3 exemplify features of a system according to one or more embodiments.

FIG. 2 represents a non-limiting example of a radio-frequency system, for example, a Frequency Modulated Continuous Wave FMCW system, comprising a first transmission chain configured for transmitting a first transmission signal TX1, and a first reception chain configured for receiving a first reception signal RX1, indicative of the first transmission signal TX1 being reflected towards the system at a target object O (not part of the system). The system of FIG. 2 comprises the device 10 as well as a first transmission antenna AT1 and a first reception antenna AR1, coupled to the device 10. Specifically, the radio-frequency device 10 may be connected (for example, directly) to the first transmission antenna AT1 and the first reception antenna AR1 via the first transmission pad T1 and the first reception pad R1, respectively. It will be appreciated that, even if the system as represented in FIG. 2 comprises a single transmission chain and a single reception chain, this is done for the sake of simplicity and ease of understanding; however in one or more embodiments, a plurality of transmission chains may be present, each transmission chain including a transmission pad out of the transmission pads T1-T3, a respective transmission solder ball 110-114, and a respective transmission antenna, and/or a plurality of reception chains may be present, each reception chain including a reception pad out of the reception pads R1-R4, a respective reception solder ball 102-108, and a respective reception antenna.

The device 10 comprises a control circuit 12, for example, a microprocessor, a frequency generator 18, a first transmission circuit (TXC) 14, coupled to the control circuit 12 and configured for generating the first (modulated) transmission signal TX1, and a first reception circuit (RXC) 16, coupled to the control circuit 12 and configured for generating a first demodulated signal RD1 by demodulating the first reception signal RX1. Specifically, the control circuit 12 may be connected (for example, directly) to the first transmission circuit 14 and provide thereto a first transmission control signal EN1. In turn, the first transmission circuit 14 may be connected (for example, directly) to the control circuit 12 as well as to the first transmission pad T1 and may be configured for generating the first transmission signal TX1 for the first transmission pad T1 by modulating a (for example, radio frequency) carrier signal LO as a function of the first transmission control signal EN1, the carrier signal LO being sourced by a frequency generator 18 of the device 10 connected (for example, directly) to the first transmission circuit 14.

Also, the control circuit 12 may be connected (for example, directly) to the first reception circuit 16 and receive therefrom the first demodulated reception signal RD1. In turn, the first reception circuit 16 may be connected (for example, directly) to the control circuit 12 as well as to the first reception pad R1 and may be configured for generating the first demodulated reception signal RD1 by demodulating, via the carrier signal LO, the first reception signal RX1 received at the first reception pad R1, the carrier signal LO being provided to the first reception circuit 16 by the frequency generator 18 of the device 10 similarly connected (for example, directly) thereto.

Figure 3:
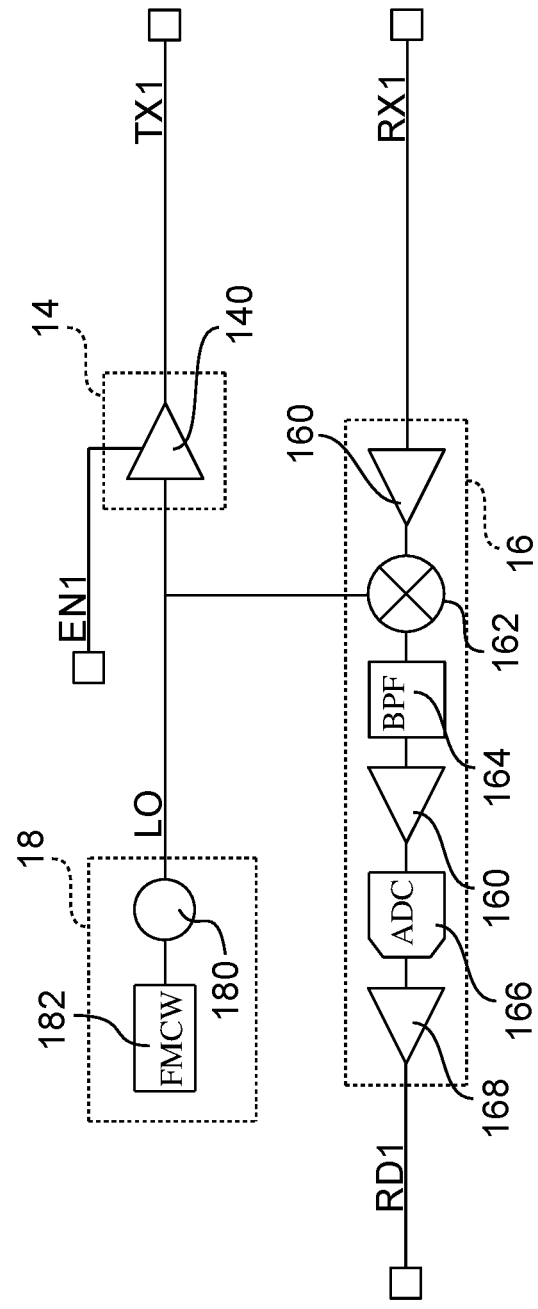

FIG. 3 exemplifies features of the device 10 according to one or more embodiments.

As exemplified herein, the frequency generator 18 comprises a voltage-controlled oscillator VCO 180, configured for generating an oscillating signal at a certain frequency depending on a control voltage applied thereto. The voltage-controlled oscillator 180 may be connected (for example, directly) to a FMCW (Frequency Modulated Continuous Wave) modulator 182, that may provide the control voltage producing the carrier signal LO having a sweeping frequency as better described in the following.

In the present non-limiting example, the first transmission circuit 14 may comprise an amplifier 140 that may receive the carrier signal LO from the frequency generator 18 as well as the first control signal EN1. For example, if the first control signal EN1 is a digital binary signal, such signal may be configured for switching the amplifier 140 between an on state (as a result of the modulating signal EN being at its high value) and an off state (as a result of the modulating signal EN being at its low value).

Also, in the present non-limiting example, the first reception circuit 16 may comprise (for example, cascaded) a first amplifier 160, such as a Low-noise amplifier (LNA), configured for amplifying the first reception signal RX1, a frequency mixer 162 configured for mixing the amplified first reception signal RX1 with the first carrier signal LO thereby demodulating said first reception signal RX1. Specifically, in the embodiment considered, the frequency mixer 162 provides at output a signal having:

a first frequency corresponding to sum of the frequencies of the amplified first reception signal RX1 and the first carrier signal LO; and a second frequency corresponding to difference between the frequencies of the amplified first reception signal RX1 and the first carrier signal LO.

In the embodiment considered, the reception circuit 16 comprises also a band pass filter (BPF) 164 downstream of the frequency mixer 162 and configured for filtering out unwanted frequencies outside a band pass frequency range: in the present non-limiting example, the band pass filter 164 may be configured for receiving the mixed first reception signal RX1 and for providing as an output only a signal indicative of the frequency difference between the amplified first reception signal RX1 and the first carrier signal LO. In various embodiments, a second amplifier 160, for example, a voltage gain amplifier VGA, and/or an analog to digital converter ADC 166 may be present downstream of the band pass filter 164, for amplifying the filtered signal and for converting the processed signal to a first demodulated digital signal RD1, respectively. The first demodulated signal RD1 may be then transmitted to the control circuit 12 via an interface 168, configured for permitting reception of the first demodulated reception signal RD1 by the control circuit 12.

Figure 4:
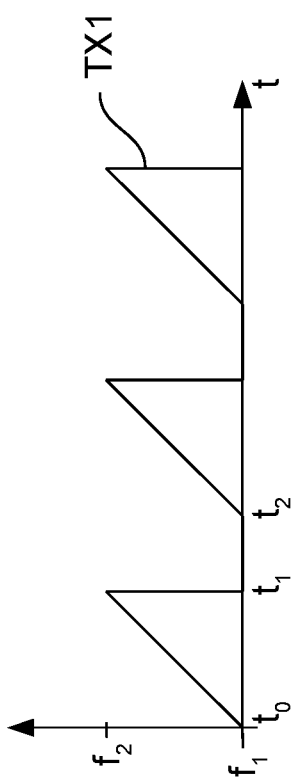
FIGS. 4 and 5 exemplify signals indicative of a transmission and reception signal during normal operation of the system.

During normal operation of the device 10, the carrier signal LO may correspond to a frequency modulated oscillating signal, for example, a continuous signal having frequency f sweeping—following for example, a saw tooth behavior—between a first frequency $f_1$, for example, 77 GHz, and a second frequency $f_2$, for example, 78 GHz, as exemplified in FIG. 4. As exemplified herein, at a time $t_0$, the frequency of the carrier signal LO may correspond to the first frequency $f_1$ and the frequency of the carrier signal LO may be increased (for example, linearly) until the second frequency $f_2$ is reached at a time $t_1$. The frequency f of the carrier signal LO may then be kept constant, for example, at the first frequency $f_1$, until a time $t_2$ is reached and a new cycle is started, i.e. the cycle end-time $t_2$ corresponds to a cycle start-time of the following cycle.

Also, during normal operation of the device 10, the first control signal EN1 may switch between a high value, to activate the amplifier 140 and a low value, to deactivate the amplifier 140 wherein the first control signal EN1 may have a frequency smaller than the frequency range (between a lower threshold and an upper threshold) of the band pass filter 164. For example, the first control signal EN1 may be used as a transmission selection mechanism (for example when a plurality of transmission chains are present in the RF system), for example, enabling transmission from the first transmission chain when the first control signal EN1 is at its high value or for inhibiting such transmission when the first control signal EN1 is at its low value.

Figure 5:
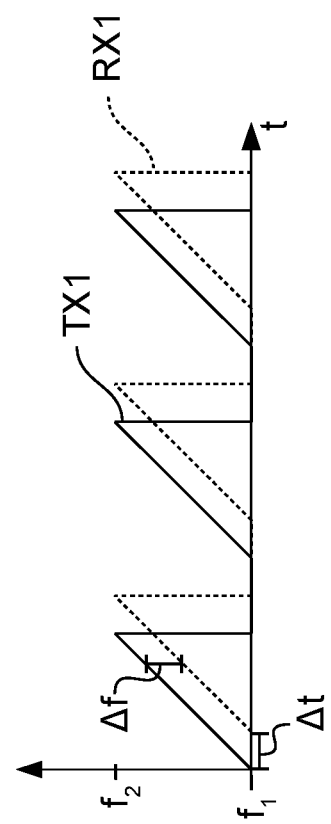

In FIG. 5, an example of the first reception signal RX1 is represented in dashed line during normal operation of the device 10, in the case wherein the first transmission signal TX1 (exemplified in FIG. 5 with a full line) is transmitted, reflected at a stationary object O, and received at the first reception chain after a first time interval Δt, indicative of a time of flight of the first transmission signal TX1, for example, few ns.

In the embodiment considered, the frequency mixer 162 receives the carrier signal LO (that, in normal operation, corresponds to the first transmission signal TX1) and the first reception signal RX1 and produces as an output, amongst other, a signal indicative of a frequency difference between the two signals: that is, as exemplified in FIG. 5, a mixed signal having a mixed frequency Δf indicative of a frequency difference present between the carrier signal LO and the first reception signal RX1.

Accordingly, in the embodiment considered, the band pass filter 164 applied to the mixed signal at the output of the mixer 162 maintains only the frequencies of the mixed signal being in a given frequency interval. Accordingly, the filter 164 should be configured such that the mixed frequency Δf lies within the frequency interval of the band pass filter 164. More specifically, insofar as the frequency difference Δf depends on the distance of the target O from the RF system, the bandpass filter may be configured to select only a given range of the frequency difference Δf, thereby permitting to limit the detection of targets O between a given minimum and maximum distance from the RF system, i.e. the band pass filter 164 may be used to filter noise signals due to components in the signal RX1 generated by other objects, different from the target O.

For example, a reflecting surface positioned close to the transmission and reception antennas, such as a bumper of the vehicle and/or components providing on board and on silicon isolation for the RF system, may produce the echo first reception signal RX1 after a limited time of flight, and a corresponding mixed signal may result having a low mixed frequency Δf (almost DC or, at most, of few kHz), insofar as the frequency difference Δf between the carrier signal LO and the first reception signal RX1 is a function of the first time interval Δt indicative of the time of flight of the first transmission signal TX1. The band pass filter 162, during normal operation, may thus be able to filter out the reception signals indicative of the distance of such components. Conversely, the band pass filter 164 is configured to pass signals having a certain range of frequencies, that may be indicative of the distance of the intended target O. Accordingly, the control circuit 12 may compute a distance of the target O as a function of the frequency difference Δf.

In one or more embodiments, the control circuit 12 may be configured to activate a reception test phase and, optionally, a transmission test phase as a function of a test signal. Such test phases may be performed for testing the electrical connection of the reception and/or transmission pads of the device 10 to the corresponding reception and/or transmission antennas, connected to the pads via respective reception and/or transmission solder balls.

Figure 6:
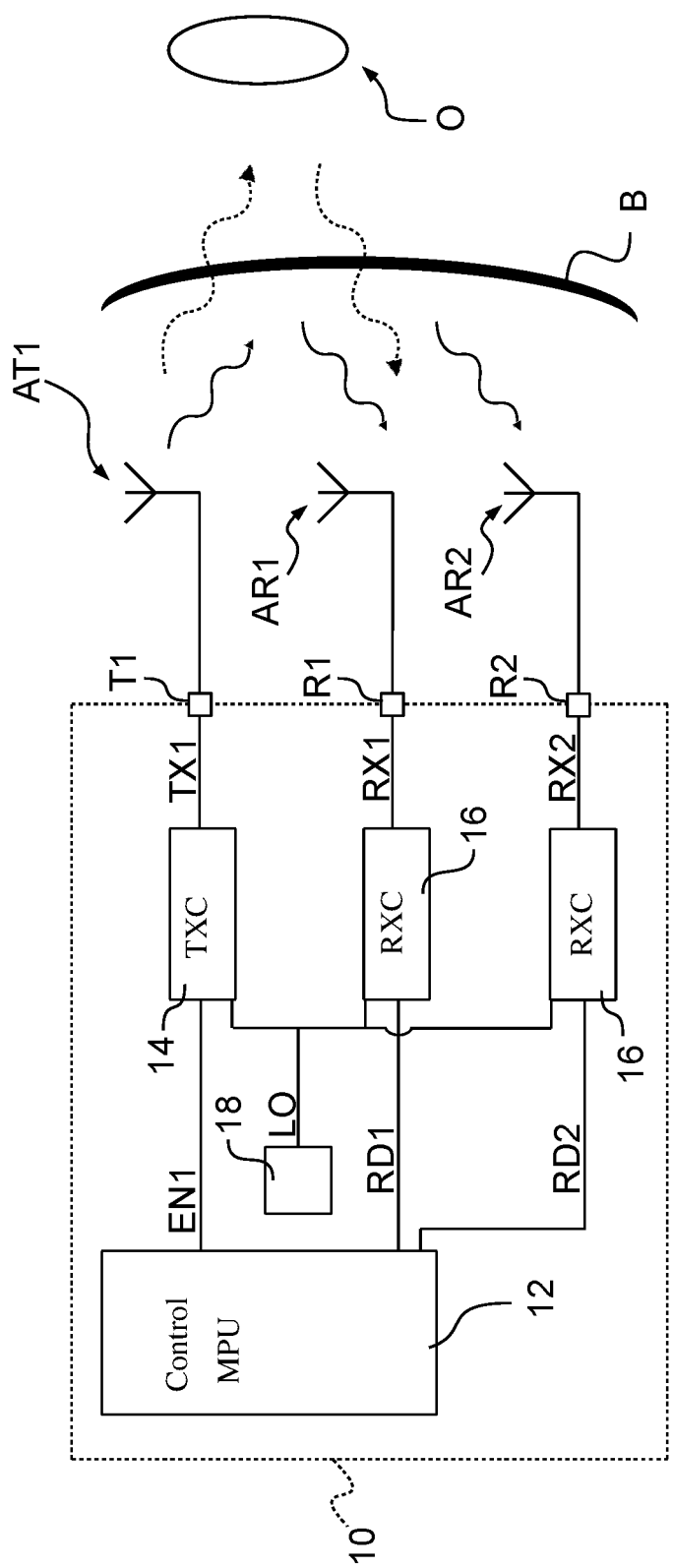
FIGS. 6 and 7 represent features of a system according to one or more embodiments.

FIG. 6 shows a non-limiting example of the RF system according to one or more embodiments, adapted to perform the reception test phase, comprising the first transmission chain, the first reception chain and a second reception chain. Again, for the sake of simplicity, only these transmission and reception chains are represented, however the possibility exists of employing a RF system including a plurality of transmission chains and a plurality of reception chains.

In the RF system as represented in FIG. 6:
- the first transmission chain may comprise the first transmission circuit 14, receiving the carrier signal LO and the first control signal EN1 as well as the first transmission pad T1 connected (for example, directly) via the first transmission solder ball 110 to the first transmission antenna AT1,
- the first reception chain may comprise the first reception antenna AT1 connected (for example, directly) via the first reception solder ball 102 to the first reception pad R1 and the first reception circuit 16 and receiving the carrier signal LO and the first reception signal RX1, and
- the second reception chain may comprise a second reception antenna AT2 connected (for example, directly) via the second reception solder ball 104 to the second reception pad R1 and a second reception circuit 16 and receiving the carrier signal LO and the first reception signal RX2.

The RF system may be employed, as already discussed, in automotive applications, for example, it may be mounted on a vehicle. Accordingly, a reflecting surface such as the bumper B of the vehicle may be present, at a relatively short distance to the RF system, that is at a distance that may be significantly smaller with respect to a distance of targets O detectable by the system. Just by way of example, in the present non-limiting example, the reflecting surface may be represented by the bumper B, however different reflecting surfaces may be employed, such as the components providing on board and on silicon isolation for the RF system (that may be similarly positioned close to the transmission and reception antennas of the RF system).

In one or more embodiments, during the reception test phase, the first transmission signal TX1 may be modulated, for example, via an Amplitude-Shift Keying ASK modulation, wherein amplitude variations of a carrier signal may be used for conveying digital information. For example, the possibility exists to employ an on-off keying (OOK) modulation, that is a binary modulation wherein a carrier signal may be selectively transmitted or failed to be transmitted depending on a switching of a binary, digital modulation signal. In the present non-limiting example of RF system, the frequency generator 18 may produce the carrier signal LO having amplitude A and a constant frequency $f_{LO}$, whereas the control circuit 12 may generate the first control signal EN1 being, for example, a binary digital signal having frequency $f_{EN}$, that may correspond to the ASK modulating signal. The resulting ASK modulated first transmission signal TX1 may thus correspond to a multiplication of the carrier signal LO and the first control signal EN1 as described in the following. The carrier signal LO and the first control signal EN1 may have equation:

$$LO(t) = V_p * \sin(\omega_p t)$$

$$EN1(t) = \begin{cases} 1, & 0 < t < T/2 \\ 0, & \dfrac{T}{2} < t < T \end{cases}$$

respectively, wherein T represents a time period of the first control signal EN1, and $\omega_p = 2\pi * f_{LO}$.

Accordingly, the first transmission signal TX1 may have equation:

$$TX1(t) = LO(t) * EN1(t) = V_p * \sin(\omega_p t) * EN1(t)$$

The first control signal EN1 may be written via a corresponding Fourier series expansion:

$$EN1(t) = \frac{1}{2} + \frac{2}{\pi} \sum_{n=1}^{\infty} \sin(n \omega_m t)$$

wherein n comprises odd, positive integers, and $\omega_m = 2\pi * f_{EN} = 2\pi/T$, thereby:

$$TX1(t) = V_p * \sin(\omega_p t) * \left( \frac{1}{2} + \frac{2}{\pi} \sum_{n=1}^{\infty} \sin(n\omega_m t) \right)$$

$$TX1(t) = \frac{V_p}{2} * \sin(\omega_p t) + \frac{V_p}{\pi} * \left( \sum_{n=1}^{\infty} \frac{\cos[(\omega_p - n\omega_m)t] - \cos[(\omega_p + n\omega_m)t]}{n} \right)$$

n being odd, positive integers.

Accordingly, in the embodiment considered, the first transmission signal TX1 may comprise components at frequencies $f_{LO}+f_{EN}$ and $f_{LO}-f_{EN}$. In various embodiments, while having a different value, the frequency $f_{EN}$ may be selected independent from the frequency $f_{LO}$ of the carrier signal LO. Specifically, in various embodiments, the frequency $f_{EN}$ of the first control signal EN1 is chosen so that it is comprised within the frequency band of the band pass filter 164.

In one or more embodiments, the possibility exists of exploiting a different type of modulation for the first transmission signal TX1 that may be transmitted by the first transmission chain. For example, the first transmission circuit 14 may comprise a frequency mixer that may receive the carrier signal LO, as well as the first control signal EN1, for example, comprising an intermediate frequency signal that may modify frequency and/or amplitude of the carrier signal LO. For example, the first transmission signal TX1 may undergo a Phase-Shift Keying PSK modulation. Accordingly, the first transmission circuit 14 may comprise a phase shifter that may receive as an input the carrier signal LO and the intermediate frequency signal and provide as an output the first transmission signal TX1, PSK-modulated.

Once transmitted, the first transmission signal TX1 may be reflected at the target O and/or at the bumper B. The first reception chain may therefore receive the first signal RX1 due to the bumper B (exemplified in FIG. 6 with a full line arrow) and, optionally, the first reception signal RX1 due to the target O (exemplified in FIG. 6 with a dashed line arrow)

and may down convert such signal, for example, with a homodyne configuration as described in the foregoing.

Specifically, during the reception test phase, the first reception signal RX1 due to the target O may be considered negligible, insofar as the first reception signal RX1, if received (for example, the target O may not be present), may result attenuated and may be difficult to detect. Also, the first reception signal RX1 and the second reception signal RX2, resulting from the target O, may not coincide. Accordingly, the RF system may perform the test phase without using external components to the vehicle such as the target O.

Conversely, the first reception signal RX1 and the second reception signal RX2, for example, due to the bumper B, may have an amplitude of about 20/25 dB, which in general is lower than the transmitted power of the first transmission signal TX1, and may be detected by the first and second reception chain of the RF system, respectively. In one or more embodiments, the modulated first reception signal RX1 and the modulated second reception signal RX2 may comprise a component at the frequency $f_w$ of the carrier signal LO and a component at the frequency $f_{EN}$ of the first control signal EN1 that may be independent from the bumper B or other external components, such as the target O. It will be appreciated that an amplitude of the first reception signal RX1 and an amplitude of the second reception signal RX2 that may be due to the bumper B are substantially constant, that is the different reception chains may receive the same constant signal from the bumper B, if the transmission chains and the reception chains of the RF system are operating properly.

Accordingly, the first reception pad R1 may receive the first reception signal RX1 due to the bumper B and the second reception pad R2 may receive the second reception signal RX2 due to the bumper B and transmit these signals to the respective first and second reception circuit 16.

With reference to the first reception circuit 16 (the same applying to each reception circuit of the system), in the frequency mixer 162 the carrier signal LO, having frequency $f_{LO}$, may be mixed with the first reception signal RX1, having components at frequencies $f_{LO}$ $f_{EN}$ and $f_{LO}-f_{EN}$, shifted in time with respect to the carrier signal LO due to the time of flight as previously discussed, with the time of flight for the first RX1 and second RX2 reception signal being limited due to the close proximity of the bumper B to the first AR1 and second AR2 reception antenna. As a result, the frequency mixer 162 may produce, amongst others, signals having resulting frequencies being the difference between the frequency of the carrier signal LO and the frequencies of the components of first reception signal RX1.

The band pass filter 164 may filter out the signals that may be outside the predetermined range of frequencies, conversely the mixed signal at the frequency+$f_{EN}$ corresponding to the frequency of the first control signal EN1 may pass through the band pass filter 164 and may be transmitted to the control circuit 12 after being further processed (for example, digitalized at 166, amplified at 160, 168), as previously described.

A first RD1 and a second RD2 demodulated reception signal may result from the first and second reception circuit, respectively, that may be indicative of the first RX1 and second RX2 reception signal. Accordingly, these demodulated reception signals RD1, RD2 may be used to test if a defect and/or break occurs in a solder ball of one or more reception chains.

In one or more embodiments, during the reception test phase, the device 10 may be configured to:

generate (only) the first transmission signal TX1 and transmit it to the first transmission antenna AT1 via the first transmission pad T1, receive the first reception signal RX1 due to the bumper B from the first reception antenna AR1 via the first reception pad R1, demodulate the first reception signal RX1 via the first reception circuit 16 and generate the first demodulated reception signal RD1, receive the second reception signal RX2 due to the bumper B from the second reception antenna AR2 via the second reception pad R2, demodulate the second reception signal RX2 via the second reception circuit 16 and generate the second demodulated reception signal RD2, and test whether the first reception signal RX1 received by the first reception pad R1 corresponds to the second reception signal RX2 received by the second reception pad R2 by analyzing the first demodulated reception signal RD1 and the second demodulated reception signal RD2; and as a result of the test indicating that the first reception signal RX1 and the second reception signal RX2 do not correspond, generate a reception error signal indicating a reception error.

In one or more embodiments, the reception test phase may be controlled by the control circuit 12, that may be configured for:

generate the first control signal EN1, in order to produce the first transmission signal TX1, receive the first demodulated reception signal RD1 and the second demodulated reception signal RD2 indicative of the first reception signal RX1 and the second reception signal RX2, respectively, determine a first amplitude of the first demodulated reception signal RD1 indicative of the first reception signal RX1, determine a second amplitude of the second demodulated reception signal RD2 indicative of the second reception signal RX2, comparing the first and second amplitude, and if the amplitude of the first demodulated reception signal RD1 does not correspond to the amplitude of the second demodulated reception signal RD2, a defect may be present in one of the reception chains and the reception error signal may be produced, indicative of the defect being detected.

In one or more embodiments, the amplitudes of the first RD1 and second RD2 demodulated reception signal may be compared to a predetermined value, that may be indicative of an expected reception signal, for example, a signal having amplitude of 20/25 dB, which in general is lower than the transmitted power of the first transmission signal TX1, and if the amplitude of the first RD1 resp. second RD2 demodulated reception signal does not correspond to the predetermined value, the reception error signal may be generated, indicating that the first resp. second reception chain comprises a defect or break.

Optionally, the possibility exists to store, during each reception test phase, the first RD1 and second RD2 demodulated reception signal, for example the absolute amplitude thereof or the variations of the amplitudes, so that a monitoring in time of the operating conditions of the first reception chain and the second reception chain may be possible, that may be indicative of a defect occurring over time in one or more reception chains.

For example, with reference to the first reception chain, the possibility exists, during a current transmission test phase, to compare the first demodulated reception signal RD1 of the current reception test phase with the first demodulated reception signal RD1 of a previous transmission test phase. A difference between these amplitudes may be indicative of a defect that may result during the life of the first reception chain of the RF system.

Accordingly, during the reception test phase, the device 10 may be able to:

- identify if a solder ball break occurs in one or more reception chains that hinders reception of the reception signals,
- identify if a defect is present in one or more reception chains that worsens reception of the reception signals, and/or
- identify if operation of one or more reception chains deteriorate during the RF system life.

It will be appreciated that, in the reception test phase exemplified herein, the first and second reception chain may be tested by means of the first transmission chain; however this is merely an arbitrary choice, and each transmission chain may act as the testing transmission chain.

In one or more embodiments, if a defect and/or break is present, the device 10 may operate accordingly in response, that is the device 10 may discontinue operation of the defective chain.

If the presence of the defect is verified, the possibility exists to identify the defective reception chain out of the first and second reception chain. Specifically, it may be possible to identify the defective reception chain by identifying the demodulated reception signal out of the first and second demodulated reception signal RD1, RD2 having smaller amplitude, insofar as a defect in the reception chain would result in a reception signal having smaller (or null) amplitude.

In one or more embodiments, the control circuit 12 may optionally transmit to a display of the system (not shown in the Figures) the reception error signal.

Figure 7:
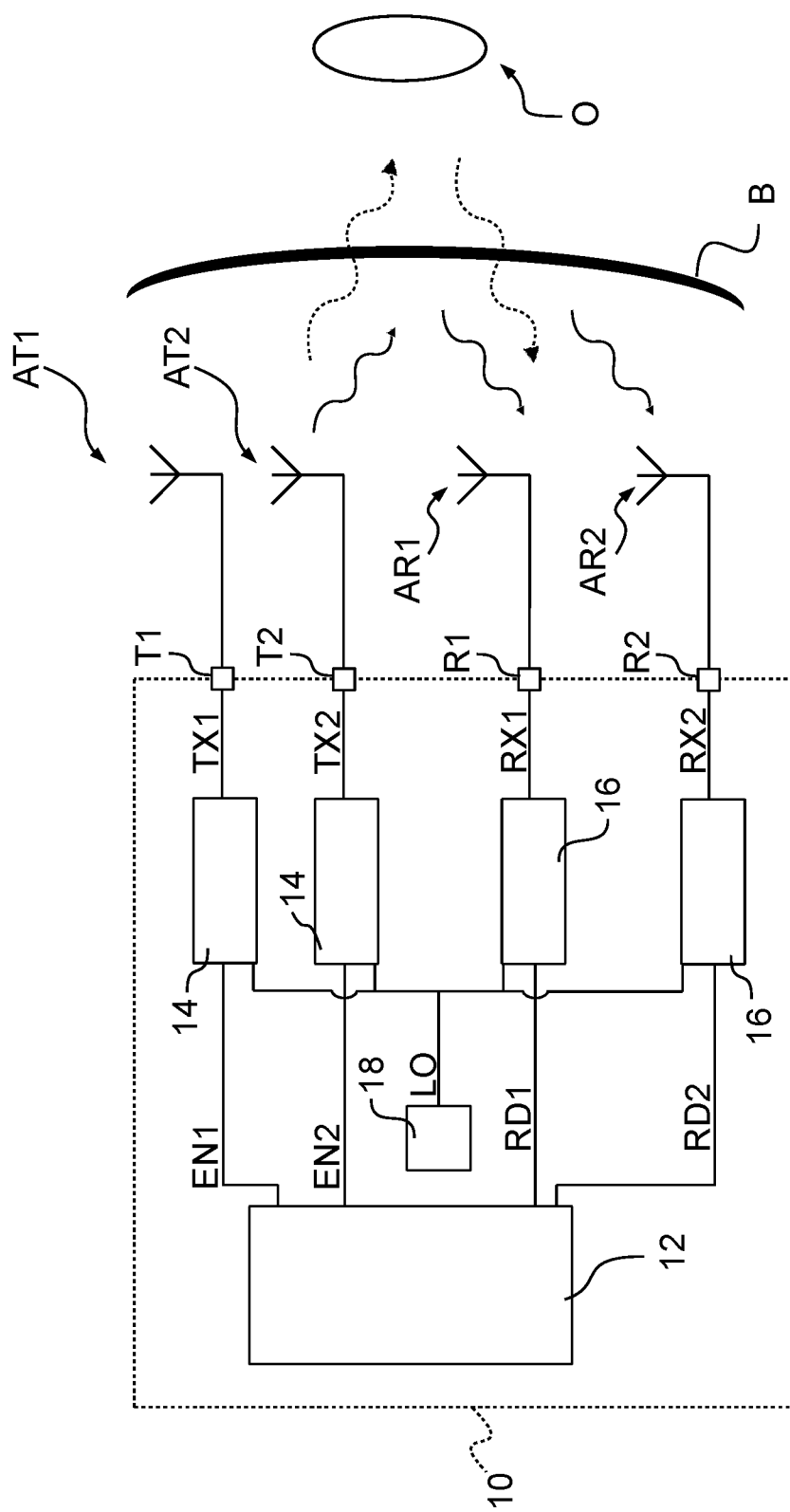

In one or more embodiments, also a transmission test phase may be used, in a RF system having the first transmission chain and also a second transmission chain as exemplified in FIG. 7. In FIG. 7, parts or elements already discussed in connection with FIG. 6 are indicated with like references and a corresponding detailed description will not repeated for the sake of brevity. In the RF system as represented in FIG. 7, the second transmission chain may comprise a second transmission circuit 14, receiving the carrier signal LO and a second control signal EN2 as well as the second transmission pad T2 connected (for example, directly) via the second transmission solder ball 112 to a second transmission antenna AT2.

Also during the transmission test phase the first reception signal RX1 due to the target O may be considered negligible, insofar as the first reception signal RX1, if received (for example, the target O may not be present), may result attenuated and may be difficult to detect. Accordingly, the RF system may perform the transmission test phase without using external components to the vehicle such as the target O.

In one or more embodiments, during the transmission test phase, the device 10 may be configured to:

- in a first phase, generate (only) the first transmission signal TX1, provide the first transmission signal TX1 to the first transmission pad T1, and receive the first reception signal RX1 due to the bumper B from the first reception pad R1,
- store the first demodulated reception signal RD1 indicative of the first reception signal RX1 received during the first phase,
- in a second phase, subsequent to the first phase, generate (only) the second transmission signal TX2, provide the second transmission signal TX2 to the second transmission pad T2, and receive the first reception signal RX1 due to the bumper B from the first reception pad R1,
- test whether the first transmission signal TX1 corresponds to the second transmission signal TX2 by analyzing the stored first demodulated reception signal RD1 received during the first phase and the first demodulated reception signal RD1 received during the second phase; and
- as a result of the test indicating that the first transmission signal TX1 and the second transmission signal TX2 do not correspond, generate a transmission error signal indicating a transmission error.

It will be appreciated that, in the transmission test phase exemplified herein, the first and second transmission chain may be tested by means of the first reception chain; however this is an arbitrary choice, and each reception chain may act as the testing reception chain.

In one or more embodiments, the reception test phase may be controlled by the control circuit 12, that may be configured for:

- in the first phase, generate only the first control signal EN1, in order to produce the first transmission signal TX1,
- in the second phase, generate only the second control signal EN2, in order to produce the second transmission signal TX2,
- receive and store the first demodulated reception signal RD1, indicative of the first reception signal RX1 received during the first phase,
- receive the first demodulated reception signal RD1, indicative of the first reception signal RX1 received during the second phase,
- determine a third amplitude of the stored first demodulated reception signal RD1 indicative of the first reception signal RX1 received during the first phase,
- determine a fourth amplitude of the first demodulated reception signal RD1 indicative of the first reception signal RX1 received during the second phase,
- comparing the third and fourth amplitude, and
- if the third amplitude and the fourth amplitude do not correspond, a defect may be present in one of the transmission chains and the transmission error signal may be produced, indicative of the defect being detected.

In one or more embodiments, the amplitudes of the first demodulated reception signal RD1 indicative of the first reception signal RX1 received during the first phase and during the second phase may be compared to a predetermined value, and if these amplitudes do not correspond to the predetermined value, the reception error signal may be generated, indicating that the first and/or second transmission chain, respectively, comprise a defect or break.

Optionally, the possibility exists to store, during each transmission test phase, also the first demodulated reception signal RD1 indicative of the first reception signal RX1 received during the second phase, for example the absolute amplitude thereof or the variations of the amplitudes, so that a monitoring in time of the operating conditions of the first transmission chain and the second transmission chain may be possible, that may be indicative of a defect occurring over time in one or more transmission chains. For example, with reference to the first transmission chain, the possibility exists, during a current transmission test phase, to compare the first demodulated reception signal RD1 indicative of the first reception signal RX1 received during the first phase of the current transmission test phase with the first demodulated reception signal RD1 indicative of the first reception signal RX1 received during the first phase of a previous transmission test phase. A difference between these amplitudes may be indicative of a defect that may result during the life of the first transmission chain of the RF system.

Accordingly, during the transmission test phase, the device 10 may be able to:
- identify if a solder ball break occurs in one or more transmission chains that hinders transmission of the transmission signals,
- identify if a defect is present in one or more transmission chains that worsens transmission of the transmission signals, and/or
- identify if operation of one or more transmission chains deteriorate during the RF system life.

It will be appreciated that, in the transmission test phase exemplified herein, the first and second transmission chain may be tested by means of the first reception chain; however this is merely an arbitrary choice, and each transmission chain may act as the testing transmission chain.

In one or more embodiments, if a defect and/or break is present, the device 10 may operate accordingly, that is the device 10 may discontinue operation of the defective chain.

If the presence of the defect is verified, the possibility exists to identify the defective transmission chain out of the first and second transmission chain. Specifically, it may be possible to identify the defective transmission chain by identifying during which phase, out of the first and second phase, the first demodulated reception signal RD1 has smaller amplitude, insofar as a defect in the transmission chain would result in a respective reception signal having smaller (or null) amplitude.

In one or more embodiments, the control circuit 12 may optionally transmit to a display of the system (not visible) the transmission error signal.

Without prejudice to the underlying principles, the details and embodiments may vary, even significantly, with respect to what has been disclosed by way of example only, without departing from the extent of protection.

The extent of protection is defined by the annexed claims.

The invention claimed is:

1. A radio-frequency transceiver device, comprising:
   at least a first transmission pad, wherein said first transmission pad is configured to be connected to a first transmission antenna;
   a first transmission circuit, wherein said first transmission circuit is configured to generate a first transmission signal for said first transmission pad by modulating a radio frequency signal as a function of a first transmission control signal;
   at least a first reception pad and a second reception pad, said first and second reception pads configured to be connected to a first reception antenna and a second reception antenna, respectively;
   at least a first reception circuit and a second reception circuit, wherein said first and second reception circuits are configured to generate a first demodulated reception signal and a second demodulated reception signal, respectively, by demodulating a first signal and a second signal received by said first and second reception pads, respectively, using the radio frequency signal, and wherein each of said first reception circuit and said second reception circuit comprises a band pass filter configured to pass signals having frequencies between a first frequency and a second frequency;
   wherein the radio-frequency transceiver device comprises a control circuit configured to operate during a reception test phase to:
      generate said first transmission control signal, wherein said first transmission control signal has a frequency lying between said first frequency and said second frequency during said reception test phase;
      test, as a function of said first and said second demodulated reception signal, whether said first signal received by said first reception pad corresponds to said second signal received by said second reception pad; and
      generate a reception error signal indicating a reception error when said test indicates that said first signal and said second signal do not correspond.

2. The device according to claim 1, wherein said control circuit is configured to generate said first transmission control signal during a normal operation phase, and wherein said first transmission control signal has a frequency that is smaller than said first frequency and said second frequency.

3. The device according to claim 1, wherein the reception error signal comprises:
   a first reception error signal indicative of an error of said first reception pad, said first reception error signal being generated by the control circuit when an amplitude of said first demodulated reception signal is smaller than an amplitude of said second demodulated reception signal; and
   a second reception error signal indicative of an error of said second reception pad, said second reception error signal being generated by the control circuit when the amplitude of said first demodulated reception signal is greater than the amplitude of said second demodulated reception signal.

4. The device according to claim 1, wherein the control circuit is configured to:
   store the first demodulated reception signal and the second demodulated reception signal after each reception test phase;
   generate the reception error signal indicative of an error of said first reception pad, in a current reception test phase, when an amplitude of said first demodulated reception signal is smaller than an amplitude of said first demodulated reception signal stored in a previous reception test phase; and
   generate the reception error signal indicative of an error of said second reception pad, in the current reception test phase, when an amplitude of said second demodulated reception signal is smaller than an amplitude of said second demodulated reception signal stored in a previous reception test phase.

5. The device according to claim 1, wherein said first transmission control signal is a digital signal, and wherein said first transmission circuit is configured to generate the respective first transmission signal for said first transmission pad by performing an Amplitude Shift Keying modulation of said radio frequency signal as a function of the respective first transmission control signal.

6. The device according to claim 1, comprising:
   a second transmission pad, wherein said second transmission pad is configured to be connected to a second transmission antenna;
   a second transmission circuit, wherein said second transmission circuit is configured to generate a second transmission signal for said second transmission pad by modulating the radio frequency signal as a function of a second transmission control signal;

wherein the control circuit is configured to operate during a transmission test phase to:
in a first phase: generate only said first transmission control signal and store said first demodulated reception signal received by said first reception pad during said first phase,
in a second phase: generate only said second transmission control signal and receive said first demodulated reception signal received by said first reception pad during said second phase;
test, as a function of said first demodulated reception signal received during said first phase and said first demodulated reception signal received during said second phase, whether said first transmission signal corresponds to said second transmission signal; and
generate a transmission error signal indicating the transmission error when said test indicates that said first transmission signal and said second transmission signal do not correspond.

7. The device according to claim 6, wherein:
each of said first and second reception circuit comprises a band pass filter that is configured to pass signals with frequencies between a first frequency and a second frequency, and said second transmission control signal has a frequency lying between said first frequency and said second frequency, and
said second transmission control signal is a digital signal, and said second transmission circuit is configured to generate the respective second transmission signal for said second transmission pad by performing an Amplitude Shift Keying modulation of said radio frequency signal as a function of the respective second transmission control signal.

8. The device according to claim 6, wherein the control circuit is configured to:
determine a first amplitude of said first reception signal during said first phase; and
determine a second amplitude of said first reception signal during said second phase,
wherein the transmission error signal comprises:
a first transmission error signal indicative of an error of said first transmission pad generated by the control circuit when said first amplitude is smaller than said second amplitude; and
a second transmission error signal indicative of a error of said second transmission pad generated by the control circuit when said first amplitude is greater than said second amplitude.

9. The device according to claim 6, wherein said control circuit is configured to activate said transmission test phase and said reception test phase as a function of a test signal.

10. A radio-frequency system, comprising:
a radio-frequency transceiver device comprising:
at least a first transmission pad, wherein said first transmission pad is configured to be connected to a first transmission antenna;
a first transmission circuit, wherein said first transmission circuit is configured to generate a first transmission signal for said first transmission pad by modulating a radio frequency signal as a function of a first transmission control signal;
at least a first reception pad and a second reception pad, said first and second reception pads configured to be connected to a first reception antenna and a second reception antenna, respectively;
at least a first reception circuit and a second reception circuit, wherein said first and second reception circuits are configured to generate a first demodulated reception signal and a second demodulated reception signal, respectively, by demodulating a first signal and a second signal received by said first and second reception pads, respectively, using the radio frequency signal, and wherein each of said first reception circuit and said second reception circuit comprises a band pass filter configured to pass signals having frequencies between a first frequency and a second frequency;
wherein the radio-frequency transceiver device comprises a control circuit configured to operate during a reception test phase to:
generate said first transmission control signal, wherein said first transmission control signal has a frequency lying between said first frequency and said second frequency during a reception test phase;
test, as a function of said first and said second demodulated reception signal, whether said first signal received by said first reception pad corresponds to said second signal received by said second reception pad; and
generate a reception error signal indicating a reception error when said test indicates that said first signal and said second signal do not correspond;
at least a first transmission antenna connected to said first transmission pad; and
at least a first reception antenna and a second reception antenna connected to said first reception pad and said second reception pad, respectively.

11. The radio-frequency system according to claim 10, comprising a reflection surface arranged at a distance from said first transmission antenna and said first and second reception antenna.

12. The radio-frequency system according to claim 10, wherein said control circuit is configured to generate said first transmission control signal during a normal operation phase, and wherein said first transmission control signal has a frequency that is smaller than said first frequency and said second frequency.

13. The radio-frequency system according to claim 10, wherein the reception error signal comprises:
a first reception error signal indicative of an error of said first reception pad, said first reception error signal being generated by the control circuit when an amplitude of said first demodulated reception signal is smaller than an amplitude of said second demodulated reception signal; and
a second reception error signal indicative of an error of said second reception pad, said second reception error signal being generated by the control circuit when the amplitude of said first demodulated reception signal is greater than the amplitude of said second demodulated reception signal.

14. The radio-frequency system according to claim 10, wherein the control circuit is configured to:
store the first demodulated reception signal and the second demodulated reception signal after each reception test phase;
generate the reception error signal indicative of an error of said first reception pad, in a current reception test phase, when an amplitude of said first demodulated reception signal is smaller than an amplitude of said first demodulated reception signal stored in a previous reception test phase; and generate the reception error signal indicative of an error of said second reception pad, in the current reception test phase, when an amplitude of said second demodulated reception signal is smaller than an amplitude of said second demodulated reception signal stored in a previous reception test phase.

15. The radio-frequency system according to claim 10, wherein said first transmission control signal is a digital signal, and wherein said first transmission circuit is configured to generate the respective first transmission signal for said first transmission pad by performing an Amplitude Shift Keying modulation of said radio frequency signal as a function of the respective first transmission control signal.

16. The radio-frequency system according to claim 10, comprising:
a second transmission pad, wherein said second transmission pad is configured to be connected to a second transmission antenna;
a second transmission circuit, wherein said second transmission circuit is configured to generate a second transmission signal for said second transmission pad by modulating the radio frequency signal as a function of a second transmission control signal;
wherein the control circuit is configured to operate during a transmission test phase to:
in a first phase: generate only said first transmission control signal and store said first demodulated reception signal received by said first reception pad during said first phase;
in a second phase: generate only said second transmission control signal and receive said first demodulated reception signal received by said first reception pad during said second phase,
test, as a function of said first demodulated reception signal received during said first phase and said first demodulated reception signal received during said second phase, whether said first transmission signal corresponds to said second transmission signal; and
generate a transmission error signal indicating the transmission error when said test indicates that said first transmission signal and said second transmission signal do not correspond.

17. The radio-frequency system according to claim 16, wherein:
each of said first and second reception circuit comprises a band pass filter that is configured to pass signals with frequencies between a first frequency and a second frequency, and said second transmission control signal has a frequency lying between said first frequency and said second frequency, and
said second transmission control signal is a digital signal, and said second transmission circuit is configured to generate the respective second transmission signal for said second transmission pad by performing an Amplitude Shift Keying modulation of said radio frequency signal as a function of the respective second transmission control signal.

18. The radio-frequency system according to claim 16, wherein the control circuit is configured to:
determine a first amplitude of said first reception signal during said first phase; and
determine a second amplitude of said first reception signal during said second phase;

wherein the transmission error signal comprises:
a first transmission error signal indicative of an error of said first transmission pad generated by the control circuit when said first amplitude is smaller than said second amplitude; and
a second transmission error signal indicative of a error of said second transmission pad generated by the control circuit when said first amplitude is greater than said second amplitude.

19. The radio-frequency system according to claim 16, wherein said control circuit is configured to activate said transmission test phase and said reception test phase as a function of a test signal.

20. A radio-frequency transceiver device, comprising:
a first transmission pad, wherein said first transmission pad is configured to be connected to a first transmission antenna;
a second transmission pad, wherein said second transmission pad is configured to be connected to a second transmission antenna;
a first transmission circuit, wherein said first transmission circuit is configured to generate a first transmission signal for said first transmission pad by modulating a radio frequency signal as a function of a first transmission control signal;
a second transmission circuit, wherein said second transmission circuit is configured to generate a second transmission signal for said second transmission pad by modulating the radio frequency signal as a function of a second transmission control signal;
at least a first reception pad and a second reception pad, said first and second reception pads configured to be connected to a first reception antenna and a second reception antenna, respectively;
at least a first reception circuit and a second reception circuit, wherein said first and second reception circuits are configured to generate a first demodulated reception signal and a second demodulated reception signal, respectively, by demodulating a first signal and a second signal received by said first and second reception pads, respectively, using the radio frequency signal;
a control circuit configured to operate during a transmission test phase to:
in a first phase: generate only said first transmission control signal and store said first demodulated reception signal received by said first reception pad during said first phase;
in a second phase: generate only said second transmission control signal and receive said first demodulated reception signal received by said first reception pad during said second phase;
test, as a function of said first demodulated reception signal received during said first phase and said first demodulated reception signal received during said second phase, whether said first transmission signal corresponds to said second transmission signal; and
generate a transmission error signal indicating the transmission error when said test indicates that said first transmission signal and said second transmission signal do not correspond.

21. The device according to claim 20, wherein:
each of said first and second reception circuit comprises a band pass filter that is configured to pass signals with frequencies between a first frequency and a second frequency, and said second transmission control signal has a frequency lying between said first frequency and said second frequency, and said second transmission control signal is a digital signal, and said second transmission circuit is configured to generate the respective second transmission signal for said second transmission pad by performing an Amplitude Shift Keying modulation of said radio frequency signal as a function of the respective second transmission control signal.

22. The device according to claim 20, wherein the control circuit is configured to:
   determine a first amplitude of said first reception signal during said first phase; and
   determine a second amplitude of said first reception signal during said second phase;
   wherein the transmission error signal comprises:
      a first transmission error signal indicative of an error of said first transmission pad generated by the control circuit when said first amplitude is smaller than said second amplitude; and
      a second transmission error signal indicative of a error of said second transmission pad generated by the control circuit when said first amplitude is greater than said second amplitude.

* * * * *